US010438367B2

(12) United States Patent
Uchida et al.

(10) Patent No.: US 10,438,367 B2
(45) Date of Patent: Oct. 8, 2019

(54) PARALLAX CALCULATING APPARATUS

(71) Applicants: TOYOTA JIDOSHA KABUSHIKI KAISHA, Toyota-shi, Aichi (JP); DENSO CORPORATION, Kariya, Aichi-pref. (JP)

(72) Inventors: Naohide Uchida, Numazu (JP); Ken Tanabe, Kariya (JP); Hirotake Ishigami, Okazaki (JP); Masaki Kuwahara, Nukata-gun (JP); Noriaki Shirai, Chiryu (JP)

(73) Assignees: TOYOTA JIDOSHA KABUSHIKI KAISHA, Toyota-shi, Aichi-ken (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 16/145,348

(22) Filed: Sep. 28, 2018

(65) Prior Publication Data

US 2019/0102900 A1 Apr. 4, 2019

(30) Foreign Application Priority Data

Sep. 29, 2017 (JP) .................................. 2017-191795

(51) Int. Cl.
*H04N 13/00* (2018.01)
*G06T 7/593* (2017.01)
(Continued)

(52) U.S. Cl.
CPC ............ *G06T 7/593* (2017.01); *G06K 9/6202* (2013.01); *H04N 13/128* (2018.05);
(Continued)

(58) Field of Classification Search
CPC ............... H04N 13/128; H04N 13/239; H04N 2013/0081; G06T 7/593;
(Continued)

(56) References Cited

U.S. PATENT DOCUMENTS

2012/0069004 A1* 3/2012 Takama ............... H04N 13/128
345/419
2016/0098841 A1* 4/2016 Sekiguchi ........... H04N 13/239
382/106
(Continued)

FOREIGN PATENT DOCUMENTS

JP 2013-164351 A 8/2013

OTHER PUBLICATIONS

I. Haller et al., "Real-time semi-global dense stereo solution with improved sub-pixel accuracy", 2010 IEEE Intelligent Vehicles Symposium (IV), University of California, Jun. 21-24, 2010, pp. 369-376, San Diego, CA, USA.

*Primary Examiner* — Michael Lee
(74) *Attorney, Agent, or Firm* — Sughrue Mion, PLLC

(57) ABSTRACT

A parallax calculating apparatus comprises first parallax calculating means for calculating a first parallax on a basis of a reference image for all pixels in the reference image using SGM method, second parallax calculating means for calculating a second parallax on a basis of the reference image for at least a part of pixels among pixels in the reference image using BM method, and final parallax calculating means for calculating a final parallax of each of pixels in the reference image based on the first and second parallaxes. The final parallax calculating means calculates the first parallax as the final parallax for a pixel for which only the first parallax has been calculated and calculates a parallax where a decimal part of the first parallax is replaced with that of the second parallax as the final parallax for a pixel for which the first and second parallaxes have been calculated.

7 Claims, 8 Drawing Sheets

(51) Int. Cl.
*H04N 13/239* (2018.01)
*G06K 9/62* (2006.01)
*H04N 13/128* (2018.01)

(52) U.S. Cl.
CPC . *H04N 13/239* (2018.05); *G06T 2207/10012* (2013.01); *G06T 2207/20021* (2013.01); *G06T 2207/30252* (2013.01); *H04N 2013/0081* (2013.01)

(58) Field of Classification Search
CPC . G06T 2207/10012; G06T 2207/20021; G06T 2207/30252; G06K 9/6202
USPC .......................................................... 348/46
See application file for complete search history.

(56) References Cited

U.S. PATENT DOCUMENTS

| | | | | |
|---|---|---|---|---|
| 2017/0118925 | A1* | 5/2017 | Noguchi | G06Q 50/02 |
| 2018/0336701 | A1* | 11/2018 | Yokota | B60R 21/00 |
| 2019/0102602 | A1* | 4/2019 | Uchida | G06K 9/00201 |

* cited by examiner

PARALLAX CALCULATING APPARATUS

TECHNICAL FIELD

The present invention relates to a parallax calculating apparatus for calculating a parallax based on a taken image taken by means of a stereo camera.

BACKGROUND ART

A technique for calculating a parallax for each of pixels based on a taken image taken by means of a stereo camera and calculating, based on the calculated parallax, a distance (that is, a distance from the stereo camera to a region corresponding to a pixel having this parallax) has been conventionally known. A low calculation accuracy of a parallax leads to a low calculation accuracy of a distance, and therefore various apparatuses for calculating a parallax with a high accuracy have been developed.

For example, the Japanese Patent Application Laid-Open (kokai) No. 2013-164351 discloses a parallax calculating apparatus for calculating, based on an index value indicating a similarity of "each of pixels within a predetermined area of one taken image among a part of taken images" with respect to "a pixel for which a parallax is aimed to be calculated (a target pixel) in an other taken image among a part of the taken images", a parallax of this target pixel.

Semi Global Matching method (SGM) is mentioned as one example of methods for calculating a parallax. The SGM is superior to other methods for calculating a parallax (Block Matching method (BM), for example) in that SGM makes it possible to calculate a parallax even for a pixel included in a region with a relatively low texture (that is, a region with a small difference in brightness (a small lightness/darkness difference)) in the taken image.

However, on the other hand, in the SGM, a pixel locking easily occurs because of a steep slope of a parabola by parabola fitting. Here, the pixel locking is a phenomenon in which a parallax is calculated as a value close to an integer (for example, a value of an integer ±0.1 pix).

Therefore, it cannot be said that a decimal part of a parallax calculated by the SGM has such a high accuracy.

Therefore, as one method for suppressing an occurrence of the pixel locking in the SGM, a non-patent literature (Haller, Istvan, et al., "Real-time semi-global dense stereo solution with improved sub-pixel accuracy", Intelligent Vehicles symposium (IV), 2010 IEEE, United States, 2010, p. 369-376) proposes a method for adjusting an interpolation function used for estimating a decimal part of a parallax.

SUMMARY OF THE INVENTION

However, this interpolation function is a function adoptively derived for a purpose that a parallax distribution of a road surface region (a road surface parallax distribution), the road surface region having a design, becomes a uniform distribution with no pixel locking, and therefore it is highly likely that this interpolation function cannot suppress an occurrence of the pixel locking for a region having a parallax distribution different from the parallax distribution of the road surface region having a design. That is, the interpolation function proposed in the above non-literature has a low universal applicability, and thus it has been desired to develop a technique for suppressing an occurrence of the pixel locking without being affected by a type (an attribute) of a region.

The present invention is made to resolve the problem above. That is, one of objects of the present invention is to provide a parallax calculating apparatus capable of calculating a parallax of each of pixels with a high accuracy while calculating a parallax even for a pixel included in a region with a relatively low texture in a taken image.

A parallax calculating apparatus according to the present invention (Hereinafter, this apparatus will be referred to as a "present invention apparatus".) comprises;

imaging means (11, step 602) for taking an image of a region by means of a stereo camera every time a predetermined time elapses;

first parallax calculating means (step 604) for calculating, on a basis of a reference image which is one of taken images used as a reference, the taken images being taken at a same computation timing by the imaging means (11), a first parallax (d1) which is a parallax between corresponding pixels of the taken images for all pixels in the reference image by using Semi Global Matching method;

second parallax calculating means (step 618) for calculating, on a basis of the reference image, a second parallax (d2) which is a parallax between corresponding pixels of the taken images for at least a part of pixels among pixels in the reference image by using Block Matching method; and final parallax calculating means for calculating, based on the first parallax (d1) and the second parallax (d2), a final parallax (df) which is a finally calculated parallax of each of the pixels in the reference image;

wherein, the final parallax calculating means is configured to;

calculate the first parallax (d1) as the final parallax (df) for a pixel for which only the first parallax (d1) has been calculated; and calculate a parallax where a decimal part of the first parallax (d1) is replaced with a decimal part of the second parallax (d2) as the final parallax (df) for a pixel for which the first parallax (d1) and the second parallax (d2) have been calculated.

The Semi Global Matching method (SGM method) makes it possible to calculate a parallax even for a pixel included in a region with a relatively low texture (hereinafter, also referred to as a "low texture region") in the reference image, whereas the SGM method is inferior to the Block Matching method (BM method) in a calculation accuracy of a decimal part of a parallax because of a frequent occurrence of a pixel locking. On the other hand, although the BM method is inferior to the SGM method in a calculation accuracy of a parallax of a pixel included in the low texture region, the pixel locking hardly occurs and thus for a pixel included in a region where a texture is not that low, a decimal part of a parallax can be calculated with a high accuracy.

Therefore, the present invention apparatus calculates the first parallax by the SGM method for all the pixels in the reference image and further calculates the second parallax by the BM method for at least a part of pixels among the pixels in the reference image. Thereafter, the present invention apparatus calculates the first parallax as the final parallax for a pixel for which only the first parallax has been calculated and calculates a parallax where a decimal part of the first parallax is replaced with a decimal part of the second parallax as the final parallax for a pixel for which the first parallax and the second parallax have been calculated. According to this configuration, the first parallax is calculated as the final parallax for all the pixels in the reference image, and therefore a parallax can be calculated even for a pixel included in the low texture region. In addition, for at least a part of the pixels in the reference image mentioned above, a parallax where a decimal part of the first parallax is replaced with a decimal part of the second parallax is calculated as the final parallax, and thus an occurrence of the pixel locking can be suppressed for this final parallax, leading to a significant improvement in accuracy of a parallax. As a result, it becomes possible to calculate a parallax of each of the pixels with a high accuracy while calculating a parallax even for a pixel included in the low texture region in the taken image. It should be noted that "calculating the first parallax for all the pixels in the reference image" means calculating the first parallax for "all pixels for which the first parallax can be calculated" in the reference image, and does not always mean calculating the first parallax for all the pixels composing the reference image.

In addition, another aspect of the present invention apparatus further comprises pixel extracting means (step 608) for extracting, based on the first parallax (d1), a pixel corresponding to a three-dimensional object candidate among pixels in the reference image, wherein, the second parallax calculating means is configured to calculate the second parallax (d2) only for the extracted pixel.

In general, a pixel composing the reference image corresponds to any one of a three-dimensional object candidate, a road surface, or an indistinct region which is not applicable to either the three-dimensional object candidate or the road surface. Here, the three-dimensional object candidate has a predetermined size and represents a basic unit of a three-dimensional object. When a three-dimensional object has a relatively small size (a pedestrian, for example), the three-dimensional object candidate corresponds to the three-dimensional object itself. On the other hand, when a three-dimensional object has a relatively large size (a side wall, a building, and the like for example), the three-dimensional object corresponds not only to one three-dimensional object candidate, but also to a plurality of the three-dimensional object candidates. In this case, one three-dimensional object candidate corresponds to a part of the three-dimensional object.

A texture of a group of pixels corresponding to the road surface is relatively low and thus it is highly likely that appropriate values cannot be acquired even when trying to calculate the second parallax by the BM method for a group of these pixels. In addition, a tendency of a texture is uncertain for a group of pixels corresponding to the indistinct region, and thus it is obscure whether or not appropriate values can be acquired even when trying to calculate the second parallax by the BM method for a group of these pixels. On the other hand, a texture of a group of pixels corresponding to the three-dimensional object candidate is relatively high, and thus it is highly likely to properly calculate the second parallax by the BM method for a group of these pixels. Hence, the present invention apparatus extracts a pixel corresponding to the three-dimensional object candidate and calculate the second parallax only for this extracted pixel to calculate the final parallax. According to this configuration, the second parallax is selectively calculated only for a pixel included in a region with a high possibility of calculating the second parallax in a proper manner, and thus a processing efficiency can be improved while suppressing a reduction in a calculation accuracy of a parallax.

Further, in another aspect of the present invention apparatus, the second parallax calculating means is configured to;

calculate an average parallax (d1ave) which is an average value of the first parallaxes (d1) of the extracted pixels for every three-dimensional object candidate; and calculate the second parallax (d2) only for a pixel corresponding to the three-dimensional object candidate, the average parallax (d1ave) thereof being less than or equal to a predetermined parallax threshold (d1th).

A decrease in the calculation accuracy of a parallax due to the pixel locking becomes remarkable as the parallax becomes small. Therefore, the present invention apparatus calculates the average parallax for every three-dimensional object candidate and selectively calculates the second parallax only for a pixel corresponding to a three-dimensional object candidate, the average parallax thereof being less than or equal to the parallax threshold (that is, only for a pixel, a decrease in the calculation accuracy of the parallax thereof due to the pixel locking being remarkable) to calculate the final parallax. That is, the second parallax is not calculated for a pixel, the calculation accuracy of the parallax thereof not decreasing very much due to the pixel locking because the parallax thereof is relatively large. According to this configuration, the processing efficiency can be further improved while suppressing the reduction in the calculation accuracy of a parallax.

Further, in another aspect of the present invention apparatus, the second parallax calculating means is configured to;

calculate, for the extracted pixel, a brightness index value which is an index indicating a magnitude of a difference between lightness and darkness; and calculate the second parallax (d2) only for a pixel, the brightness index value thereof being greater than a predetermined index value threshold.

As mentioned above, in the BM method, a parallax cannot be calculated properly for a pixel included in the low texture region. According to the above configuration, the present invention apparatus selectively calculates the second parallax only for a pixel included in a region with a relatively high texture to acquire the final parallax. Therefore, a possibility of trying to calculate the second parallax also for a pixel for which the second parallax may not be properly calculated by the BM method can be significantly reduced, and as a result, the processing efficiency can be further improved while suppressing the reduction in the calculation accuracy of a parallax.

Further, in another aspect of the present invention apparatus, the second parallax calculating means is configured to;

calculate an average parallax (d1ave) which is an average value of the first parallaxes (d1) of the extracted pixels for every three-dimensional object candidate;

calculate, for a pixel corresponding to the three-dimensional object candidate, the average parallax (d1ave) thereof being less than or equal to a predetermined parallax threshold (d1th), a brightness index value which is an index indicating a magnitude of a difference between lightness and darkness; and calculate the second parallax (d2) only for a pixel, the brightness index value thereof being greater than a predetermined index value threshold.

According to the above configuration, the present invention apparatus selectively calculates the second parallax only for a pixel, the brightness index value thereof being greater than the index value threshold, among pixels corresponding to a three-dimensional object candidate, the average parallax thereof being less than or equal to the parallax threshold to acquire the final parallax. Therefore, the present invention apparatus calculates the second parallax only for a pixel, the calculation accuracy of the parallax thereof due to the pixel locking markedly decreasing and having a high possibility of properly calculating the second parallax by the BM method. Hence, the processing efficiency can be further improved while suppressing the reduction in the calculation accuracy of a parallax.

In the above description, references used in the following descriptions regarding embodiments are added with parentheses to the elements of the present invention, in order to assist in understanding the present invention. However, those references should not be used to limit the scope of the invention.

DESCRIPTION OF THE EMBODIMENT

First Embodiment

Figure 1:
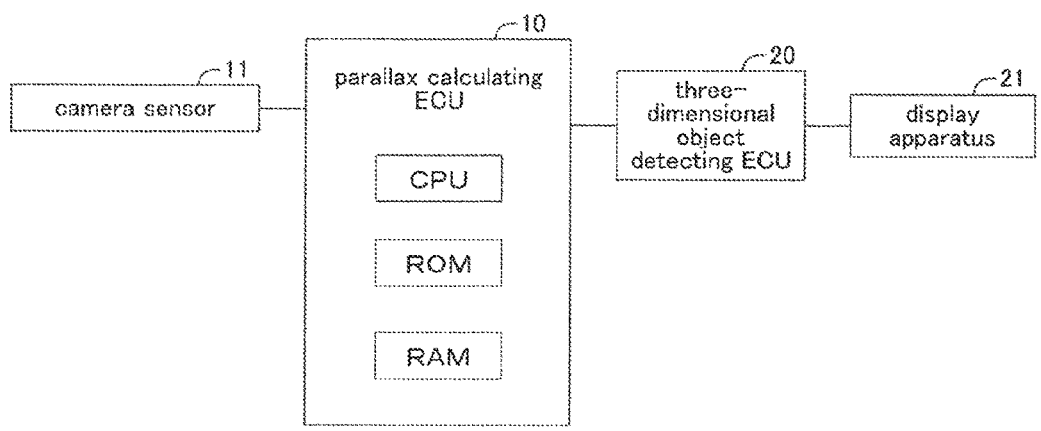
FIG. 1 is a schematic configuration diagram of a parallax calculating apparatus (hereinafter, referred to as a "first embodiment apparatus") according to a first embodiment of the present invention and a three-dimensional object display control apparatus connected to the first embodiment apparatus.

FIG. 1 is a schematic system configuration diagram of a parallax calculating apparatus (hereinafter, referred to as a "first embodiment apparatus") according to a first embodiment of the present invention and a three-dimensional object display control apparatus connected to the first embodiment apparatus. In the present embodiment, the first embodiment apparatus and the three-dimensional object display control apparatus are mounted on a vehicle. Hereinafter, a vehicle on which these apparatuses are mounted is referred to as an "own vehicle" in order to distinguish it from other vehicles.

The first embodiment apparatus comprises a parallax calculating ECU 10 and a camera sensor 11 connected to the parallax calculating ECU 10. The three-dimensional object display control apparatus comprises a three-dimensional object detecting ECU 20 and a display apparatus 21 connected to the three-dimensional object detecting ECU 20. The parallax calculating ECU 10 is connected to the three-dimensional object detecting ECU 20 in such a manner that they can mutually exchange data (communicate) via a communication/sensor type of CAN (Controller Area Network). ECU is an abbreviation of "Electric Control Unit" and comprises a microcomputer as a main part. The microcomputer includes CPU and storing devices (non-transitory computer-readable storage medium) such as ROM and RAM. The CPU is configured to realize/perform various functions by executing instructions (i.e., programs or routines) stored in the ROM. Hereinafter, the parallax calculating ECU 10 is simply referred to as "ECU 10" and the three-dimensional object detecting ECU 20 is simply referred to as "ECU 20". It should be noted that it is also possible that a single vehicle periphery monitoring ECU comprises a function of the ECU 10 and a function of the ECU 20. Further, a function of the vehicle periphery ECU may be realized by a driving support ECU configured to perform a control for supporting a driving of the own vehicle or a control for performing a collision avoidance control.

The camera sensor 11 comprises a vehicle-mounted stereo camera apparatus (illustration omitted) for taking an image in front of the own vehicle. The vehicle-mounted stereo camera apparatus is provided in a vicinity of a middle in a vehicle width direction of a front edge part of a roof of the own vehicle, and comprises a left camera arranged at a left side from a vehicle front-rear axis and a right camera arranged at a right side from the vehicle front-rear axis. The left camera mainly takes an image of a front left side region of the own vehicle every time a predetermined time elapses to output a left image signal indicating a taken left image to the ECU 10. Similarly, the right camera mainly takes an image of a front right side region of the own vehicle every time a predetermined time elapses to output a right image signal indicating a taken right image to the ECU 10. It should be noted that the left image and the right image correspond to one example of "taken images".

The ECU 10 calculates, on a basis of the right image among a left-and-right-pair of images (the left image and the right image) indicated by the left and the right image signals output from the camera sensor 11, a parallax of each of pixels composing the right image by means of two different methods based on "a type (an attribute) of a region in the right image", "a distance in a travelling direction (the depth direction) of the own vehicle from the own vehicle to this region", "a magnitude of a difference between lightness and darkness of a group of pixels in a predetermined area including a pixel for which a parallax thereof is aimed to be calculated", and so on. Thereafter, the ECU 10 calculates either one of two final parallaxes. Hereinafter, the right image is also referred to as a "reference image". The ECU 10 transmits to the ECU 20, information where a coordinate of the pixel in the reference image and a type of a region corresponding to this pixel are associated with the final parallax as pixel information.

The ECU 20 extracts pixel information of a pixel, a type of a region thereof corresponding to a "three-dimensional object candidate" among the pixel information transmitted from the ECU 10. Thereafter, the ECU 20 calculates, based on the final parallax included in the extracted pixel information, a distance in the travelling direction of the own vehicle (the depth direction) from the own vehicle to a region corresponding to the pixel (that is, the pixel with which the extracted pixel information is associated). When there exist three-dimensional object candidates adjacent to each other among a plurality of the three-dimensional object candidates, the ECU 20 determines whether these adjacent three-dimensional object candidates constitute one continuous three-dimensional object or are individual three-dimensional objects based on the calculated distance. When having determined that the adjacent three-dimensional object candidates constitute one continuous three-dimensional object, the ECU 20 couples these adjacent three-dimensional object candidates. This is how the ECU 20 detects a three-dimensional object in the reference image. The ECU 20 transmits to the display apparatus 21 a signal (display instructing signal) instructing the display apparatus 21 to display a detection result of a three-dimensional object.

The display apparatus 21 is provided at a position visible (recognizable) from a driver's seat of the own vehicle. When receiving the display instructing signal from the ECU 20, the display apparatus 21 displays the detection result of a three-dimensional object (that is, a position, a shape, a distance from the own vehicle of each three-dimensional object, and the like).

(Operation Detail)

Next, operation detail of the first embodiment apparatus will be described.

<Calculation of a First Parallax d1 by the SGM Method>

The ECU 10 of the first embodiment apparatus calculates a first parallax d1 by following procedures every time a predetermined time (a computation interval) elapses during a period (hereinafter, also referred to as an "engine on period") from a timing at which a non-illustrated engine switch (an ignition key switch) of the own vehicle has been changed into an on state to a timing at which the engine switch is to be changed into an off state. That is, the ECU 10 calculates, on a basis of the right image (the reference image) among a left-and-right-pair of the images (the left image and the right image) indicated by the left and the right image signals output from the camera sensor 11, a parallax between corresponding pixels in a left-and-right-pair of the images by means of the SGM method. Hereinafter, a parallax calculated by the SGM method is referred to as a "first parallax d1". The ECU 10 calculates the first parallax d1 for all the pixels in the reference image. It should be noted that "all the pixels" means all of pixels in the reference image, for each of which the first parallax d1 being able to be calculated, and does not always mean all the pixels composing the reference image.

The SGM method is a known method used when calculating a parallax from a plurality of taken images, and is different from other parallax calculating methods (the BM method, for example) in that the SGM method makes it possible to calculate a parallax even in the low texture region (a region with a relatively small difference between lightness and darkness). A summary of the SGM method will be described below.

Figure 2:
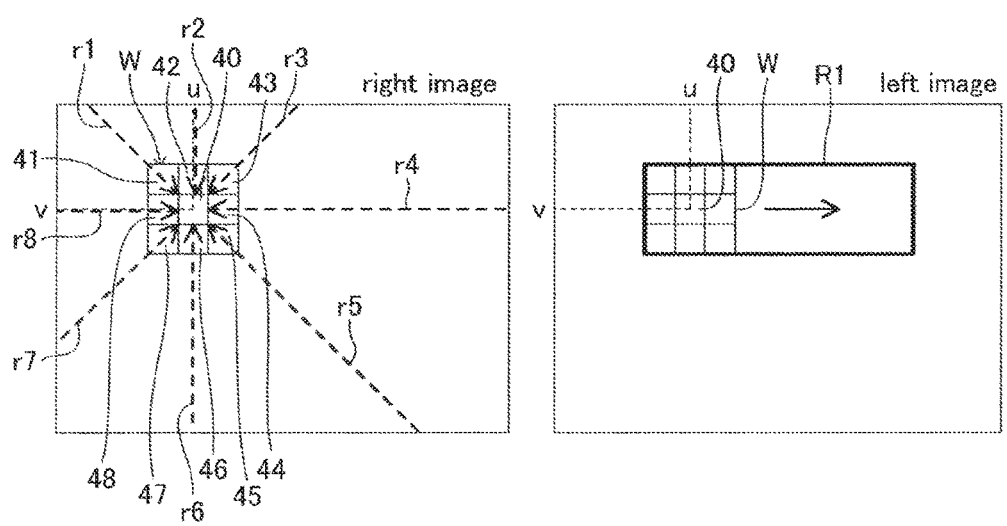
FIG. 2 is a diagram used to describe a method for calculating a matching cost using the SGM method.

As shown in FIG. 2, the ECU 10 generates a window W with a size of 3 pixels by 3 pixels by setting a pixel 40 (hereinafter, referred to as a "target pixel 40") in the reference image as a center, for the target pixel 40 the first parallax d1 being aimed to be calculated. Thereafter, the ECU 10 scans a searching area R1 in the left image by moving the window W in a horizontal direction (horizontal scanning) to calculate ZSSD (Zero-mean Sum of Squared Difference) as a matching cost every time the window W moves by one pixel. The searching area R1 is set in an area having a same v coordinate as a coordinate (u, v) of the target pixel 40 in the right image and having a predetermined length in a lateral direction. It should be noted that u and v represent a component in the lateral direction and a component in a longitudinal direction of the taken image, respectively. In an example of FIG. 2, when the ECU 10 moves the window W by 64 pixels in the horizontal direction, 65 matching costs are calculated for the target pixel 40. Hereinafter, a matching cost of a pixel, a shifting amount of a u coordinate thereof being k pixel(s) (k: 0-64) is referred to as a "kth matching cost Cmk". It should be noted that a size of the window W is not limited thereto, but a size of 5 pixels by 5 pixels may be adopted, for example.

As shown in FIG. 2, the ECU 10 calculates a cost Lk, rn (n: 1-8) in accordance with a recurrence function shown in a following equation (1) for each of paths r1 to r8 extending from an edge of the image to the target pixel 40 through each of corresponding adjacent pixels 41 to 48 of the target pixel 40, each adjacent pixel being positioned at an upper side, a lower side, a left side, a right side, and diagonal sides of the target pixel 40.

$$Lk, rn \text{ (target pixel 40)} = Cmk + \min\{Lk, rn \text{ (adjacent pixel } 4n), Lk-1, rn \text{ (adjacent pixel } 4n) + \alpha, Lk+1, rn \text{ (adjacent pixel } 4n) + \alpha, \min\_i(Li, rn(\text{adjacent pixel } 4n)) + \beta\} - \min\_i(Li, rn(\text{adjacent pixel } 4n)) \quad (1)$$

Here, $\alpha$ is a first penalty value, $\beta$ is a second penalty value, and a relationship of $\beta > \alpha$ is satisfied. In addition, $\min\_i$ $(Xi)$ represents a minimum value of $Xi$ in an area where $i=1$ to $k-2$, $k+2$ to 64. Further, on the edges of the image, values of a second and a third terms on a right side of the above equation (1) are zero. These 8 costs Lk, rn (n: 1-8) for the paths r1 to r8 regarding the target pixel 40 calculated in accordance with the equation (1) will be used in order to calculate a kth final cost Cfk (described later) for the target pixel 40.

The ECU 10 adds up these 8 kth costs Lk, r1 to Lk, r8 to calculate the kth final cost Cfk of the target pixel 40. The ECU 10 calculates 65 final costs Cfks of the target pixel 40 (k: 0-64) by the above procedures. Thereafter, the ECU 10 plots these 65 final costs Cfks on a graph defining a relationship between a shifting amount k of a pixel (on a lateral axis) and a final cost Cfk (on a longitudinal axis) and calculates a shifting amount of a pixel corresponding to a minimum value of the final cost Cfk by parabola fitting. This shifting amount of a pixel corresponds to the first parallax d1. By performing parabola fitting, the first parallax d1 is calculated as a value including a decimal part.

This is the summary of the SGM method. The SGM method is characterized by adding costs for a path extending from the edge of the image to the target pixel and calculating the final cost Cf by finally adding up the costs of paths in a plurality of directions. This characteristic realizes the aforementioned property that a parallax can be calculated even in the low texture region. It should be noted that the above summary shows one example of a method for calculating the final cost Cf, and other methods may be adopted in calculating the final cost Cf. For more detailed description on the SGM method, refer to the following non-patent literature, Haller, Istvan, et al., "Real-time semi-global dense stereo solution with improved sub-pixel accuracy", Intelligent Vehicles symposium (IV), 2010 IEEE, United States, 2010, p. 369-376. In the above literature, however, a matching cost is calculated using Census transformation, not ZSSD. It should be noted that a matching cost may be calculated using SSD (Sum of Squared Difference), SAD (Sum of Absolute Difference), or the like in place of ZSSD. The ECU 10 stores the first parallax d1 in the RAM of the ECU 10, associating the first parallax d1 with a coordinate of each of the pixels in the reference image.

<Generation of a Parallax Image>

The ECU 10 generates a parallax image based on the first parallax d1 every time the predetermined time elapses during the engine on period. The parallax image is an image consisting of pixels in the reference image, for each of which the first parallax d1 has been calculated. The first parallax d1 is associated with each of the pixels composing the parallax image. Therefore, hereinafter, each of the pixels in the parallax image is also referred to as a "parallax point". The ECU 10 stores the parallax image in the RAM thereof and updates the parallax image every time the predetermined time elapses.

<Detection of a Three-Dimensional Object Block>

In the present embodiment, the ECU 10 calculates a parallax again using the BM method as described later for a pixel satisfying predetermined conditions described later among pixels corresponding to a three-dimensional object in the reference image. Therefore, first, the ECU 10 estimates a parallax point corresponding to a three-dimensional object or a part of a three-dimensional object (described later).

Figure 3A:
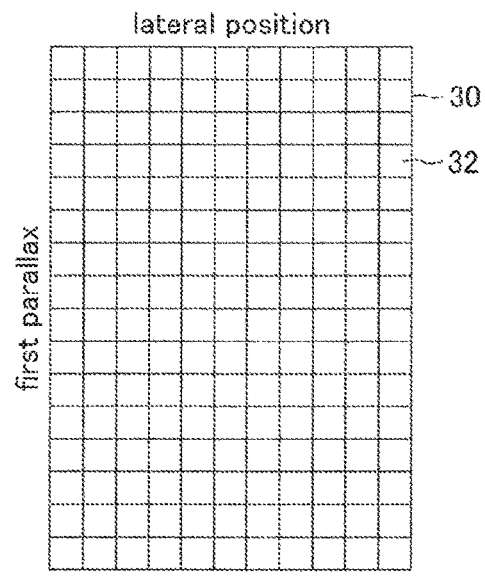
FIG. 3A is a plan view of a parallax vote map.
Figure 3B:
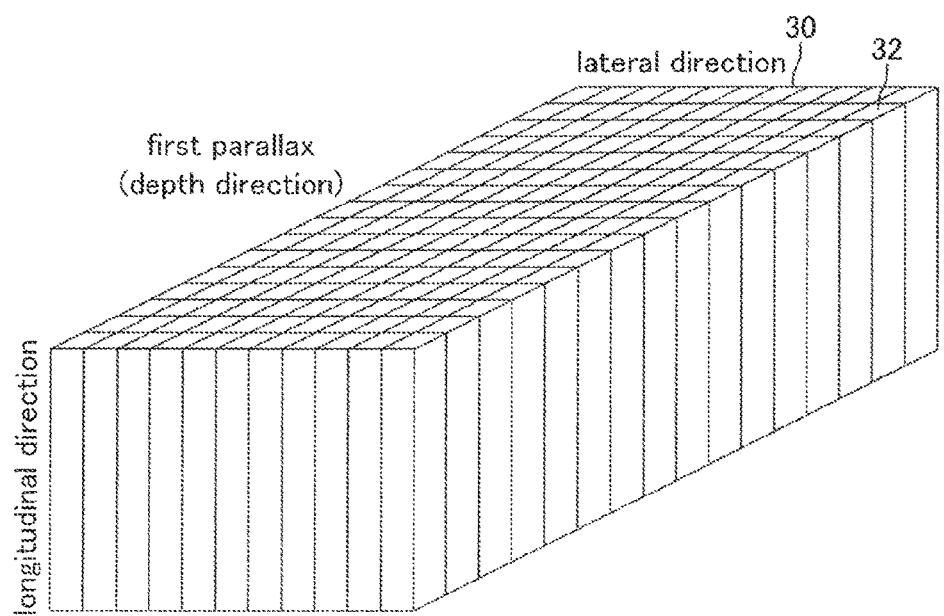
FIG. 3B is a perspective view of the parallax vote map.

FIG. 3A shows a plan view of a parallax vote map 30, and FIG. 3B shows a perspective view of the parallax vote map 30. The parallax vote map 30 is provided in the RAM of the ECU 10. As shown in FIG. 3A and FIG. 3B, the parallax vote map 30 comprises a plurality of rectangular parallelepiped blocks 32 arranged in such a manner that each edge in a lateral direction corresponds to a position in the lateral direction (the vehicle width direction) of the parallax image, each edge in a longitudinal direction corresponds to a position in the longitudinal direction of the parallax image, and each edge in a depth direction corresponds to a magnitude of a parallax. The ECU 10 sets, based on the parallax image, an attribute of the three-dimensional object or an attribute other than the three-dimensional object (the road surface, for example) for each of the blocks 32 of the parallax vote map 30. A method for setting an attribute is already known and thus hereinafter, a brief description will be made (for more details, refer to the Japanese Patent Application Laid-Open (kokai) No. 2013-161434).

The ECU 10 votes (classifies) each of the parallax points in the parallax image to a corresponding block 32 of the parallax vote map 30 based on a position of each of the parallax points (a position in the lateral direction and a position in the longitudinal direction) and a magnitude of each of the first parallaxes d1s thereof. Thereafter, the ECU 10 calculates, for each of the blocks 32 of the parallax vote map 30, an average value of the first parallaxes d1s, a deviation of the first parallaxes d1s, an average value of coordinates of the parallax points in the longitudinal direction of the parallax image, and a deviation of coordinates of the parallax points in the longitudinal direction of the parallax image. The ECU 10 stores these values in the RAM of the ECU 10. Hereinafter, the average value of the first parallaxes d1s is referred to as an "average parallax d1ave".

Figure 4:
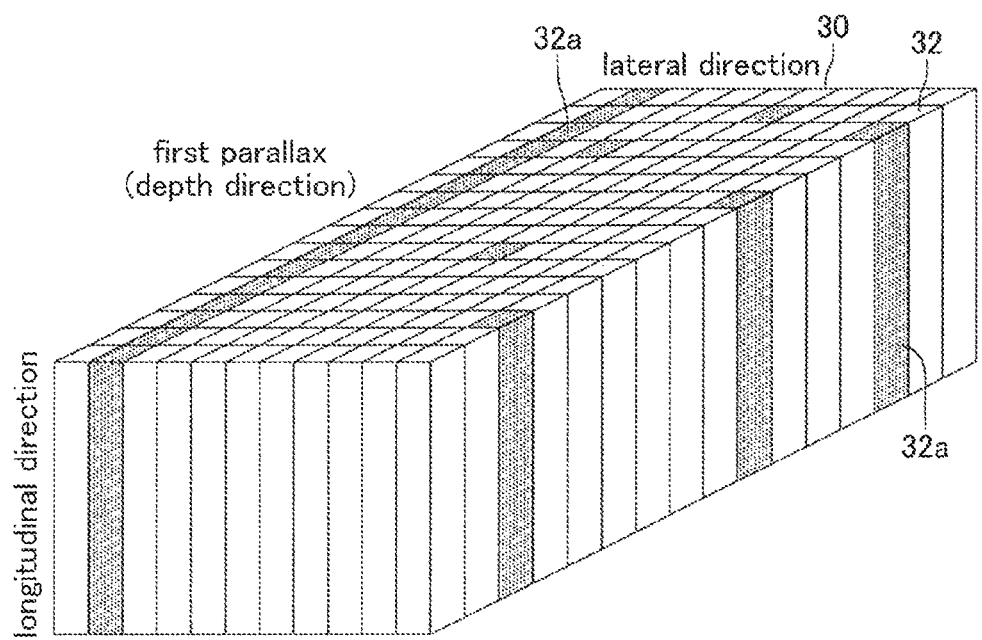
FIG. 4 is a diagram showing a parallax vote map where an attribute of a three-dimensional object or an attribute other than the three-dimensional object is set for each block.

When parallax points, each of which having a parallax (distance) with a similar magnitude, are distributed in a wide range in the longitudinal direction of the parallax image in a block 32 of the parallax vote map 30, the ECU 10 determines that a group of these parallax points indicates a three-dimensional object. Specifically, when following two conditions, that is, a condition that a distribution range in the longitudinal direction of the parallax points is more than or equal to a first threshold and a condition that a distribution range in the parallax direction of the parallax points is less than a second threshold are satisfied, the ECU 10 sets, as shown in FIG. 4, an attribute of a three-dimensional object for each of blocks 32 where these parallax points are classified. Hereinafter, a block 32 for which an attribute of a three-dimensional object is set is also referred to as a "three-dimensional object block 32a". On the other hand, for a block 32 where a distribution of the parallax points does not satisfy the aforementioned conditions, an attribute other than a three-dimensional object is set. In FIG. 4, for each of the blocks other than the three-dimensional object blocks 32a among the blocks 32, an attribute other than a three-dimensional object (for example, a road surface or an indistinct region which is not applicable to any one of the three-dimensional object and the road surface) is set. The ECU 10 detects a three-dimensional object block 32a by setting an attribute of the three-dimensional object or an attribute other than the three-dimensional object for each block in the parallax vote map 30.

The ECU 10 estimates a parallax point classified into the three-dimensional object block 32a as a three-dimensional object parallax point and estimates a parallax point classified into any blocks 32 other than the three-dimensional object blocks 32a as a parallax point other than the three-dimensional object parallax point. The ECU 10 stores a group of coordinates acquired by grouping coordinates of three-dimensional object parallax points in the parallax image for every three-dimensional object block 32a in the RAM thereof.

<Three-Dimensional Object Parallax Point Determination>

The ECU 10 makes a three-dimensional object parallax point determination to determine whether or not a parallax point (hereinafter, referred to as a "target parallax point") corresponding to a pixel in the reference image for which a final parallax df (described later) is aimed to be calculated is a three-dimensional object parallax point every time the predetermined time elapses during the engine on period. In other words, the ECU 10 determines, in this three-dimensional object parallax point determination, whether or not the target parallax point is a parallax point classified into a three-dimensional object block 32a. The determination is made based on whether or not a coordinate of the target parallax point matches (coincides) with any of the coordinates of the three-dimensional object parallax points stored in the RAM.

When having determined that the target parallax point is the three-dimensional object parallax point, the ECU 10 determines that this target parallax point is a parallax point classified into the three-dimensional object block 32a. In this case, the ECU 10 makes two determinations, that is, an average parallax determination and a brightness index value determination (each will be described later) in order to determine whether or not a pixel corresponding to this target parallax point (that is, a pixel composing the reference image) has a possibility that a parallax thereof may be aimed to be calculated again by the BM method. On the other hand, when having determined that the target parallax point is not the three-dimensional object parallax point, the ECU 10 determines that this target parallax point is a parallax point classified into any of the blocks 32 other than the three-dimensional object blocks 32a. In this case, the ECU 10 transmits to the ECU 20 the first parallax d1 which has been already calculated as a final parallax df of this target parallax point. The ECU 10 makes this determination by setting each of all the pixels in the parallax image as a target parallax point. Here, "all the pixels" means all of pixels in the parallax image, for each of which a parallax can be calculated by the BM method.

<Average Parallax Determination>

The ECU 10 makes an average parallax determination for the target parallax point determined to be classified into the three-dimensional object block 32a in the above three-dimensional object parallax point determination, the average parallax determination being a determination to determine whether or not an average parallax d1ave (an average value of the first parallaxes d1s) of the three-dimensional object blocks 32a (hereinafter, also referred to as a "target three-dimensional object block 32a") into which this target parallax point is classified is less than or equal to a predetermined parallax threshold d1th. The average parallax determination is made every time the predetermined time elapses during the engine on period. It should be noted that the average parallax d1ave of the three-dimensional object block 32a has been already calculated when detecting the three-dimensional object block(s) 32a from the parallax vote map 30.

As already known, a parallax has a correlation with a distance in the depth direction from the own vehicle (the left and the right cameras), and a value of the parallax decreases as the distance increases. Therefore, it can be also said that the above average parallax determination is a determination of whether or not "a distance in the depth direction from the own vehicle to a three-dimensional object corresponding to the target three-dimensional object block 32a" is more than or equal to a predetermined distance threshold. Therefore, when having determined that the average parallax d1ave of the target three-dimensional object block 32a is less than or equal to the parallax threshold d1th (d1ave≤d1th), the ECU 10 determines that a three-dimensional object corresponding to the target three-dimensional object block 32a is positioned at a position apart from the own vehicle by a distance more than or equal to the distance threshold. In this case, the ECU 10 makes a brightness index value determination described below. On the other hand, when having determined that the average parallax d1ave of the target three-dimensional object block 32a is larger than the parallax threshold d1th (d1ave>d1th), the ECU 10 determines that a three-dimensional object corresponding to the target three-dimensional object block 32a is positioned at a position, a distance from the own vehicle being less than the distance threshold. In this case, the ECU 10 transmits to the ECU 20 the first parallax d1 which has been already calculated as a final parallax df of this target parallax point. The ECU 10 makes this determination by setting each of all the three-dimensional object parallax points classified into the three-dimensional object blocks 32a as a target parallax point.

It should be noted that when a three-dimensional object is relatively large (a side wall, a building, and the like, for example), this three-dimensional object does not correspond only to one three-dimensional object block 32a, but correspond to a plurality of adjacent three-dimensional object blocks 32a. When the target three-dimensional object block 32a is included in one of these adjacent three-dimensional object blocks 32a, "a three-dimensional object corresponding to the target three-dimensional object block 32a" strictly means a part of a three-dimensional object. In this case, the three-dimensional object detecting ECU 20 performs processing of coupling three-dimensional object blocks 32a. This will be described later.

<Brightness Index Value Determination>

Figures 5A, 5B:
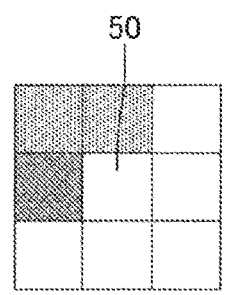
FIG. 5A is a diagram showing an operator of a sobel filter.
FIG. 5B is a diagram showing 9 pixels to which the sobel filter is to be applied.

The ECU 10 calculates a brightness index value T for a pixel (hereinafter, referred to as a "target pixel") in the reference image, the target pixel corresponding to a target parallax point classified into a three-dimensional object block 32a for which d1ave≤d1th is determined to be satisfied in the above average parallax determination every time the predetermined time elapses during the engine on period. The brightness index value T is an index indicating a magnitude of a difference between lightness and darkness of a group of pixels included within a predetermined area including this target pixel. In the present embodiment, a known sobel filter which is one type of edge detecting filters is used to calculate the brightness index value T. The sobel filter multiplies each of 9 coefficients which an operator 52 shown in FIG. 5A has with a brightness value of a pixel positioned at a corresponding position among 9 pixels with a center of a target pixel 50 shown in FIG. 5B (that is, the target pixel 50 and other 8 pixels positioned at an upper side, a lower side, a right side, a left side, and diagonal sides of the target pixel 50), and calculates an absolute value of a sum of each product as the brightness index value T. It should be noted that light and shade of each of the pixels in FIG. 5B indicates a degree of brightness. The brightness index value T becomes larger as a difference between lightness and darkness of the above 9 pixels having the target pixel as a center increases (that is, as a texture becomes high), and the brightness index value T becomes smaller as the difference between lightness and darkness decreases (that is, as a texture becomes low). CPU stores the brightness index value T of the target pixel in the RAM of the ECU 10.

The ECU 10 makes a brightness index value determination using the brightness index value T calculated as mentioned above to determine whether or not the brightness index value T of the target pixel is greater than a predetermined index value threshold Tth. In other words, the CPU determines whether or not a texture of the 9 pixels having the target pixel as a center is higher than a predetermined texture threshold. When having determined that the brightness index value T is greater than the index value threshold Tth (T>Tth), the ECU 10 determines that the texture of these 9 pixels is higher than the texture threshold. In this case, the ECU 10 determines that a parallax of this target pixel should be calculated again by the BM method. On the other hand, when having determined that the brightness index value T is less than or equal to the index value threshold Tth (T≤Tth), the ECU 10 determines that the texture of these 9 pixels is less than or equal to the texture threshold. In this case, the ECU 10 determines that a parallax of this target pixel does not have to be calculated again by the BM method and transmits to the ECU 20 the first parallax d1 which has been already calculated as a final parallax df of this target pixel.

The ECU 10 makes this determination by setting each of the pixels in the reference image corresponding to all the three-dimensional object parallax points classified into a three-dimensional object block 32a where d1ave≤d1th is determined to be satisfied in the average parallax determination as a target pixel. Therefore, there may be a case, depending on a determination result, where a three-dimensional object parallax point corresponding to a target pixel determined that T>Tth and a three-dimensional object parallax point corresponding to a target pixel determined that T≤Tth coexist in a three-dimensional object block 32a. In other words, there may be a case where a three-dimensional object parallax point for which a parallax is to be calculated again by the BM method and a three-dimensional object parallax point for which a parallax is not to be calculated again coexist in a three-dimensional object block 32a.

<Calculation of a Second Parallax d2 by the BM Method>

The ECU 10 calculates, on a basis of the reference image, a parallax between corresponding pixels in a left-and-right pair of the images by means of the BM method for a target pixel determined that T>Tth is satisfied in the above brightness index value determination every time the predetermined time elapses during the engine on period. Hereinafter, a parallax calculated by the BM method is referred to as a "second parallax d2". The BM method is known and thus only a brief description will be made below.

In the BM method, the ECU 10 moves a window with a size of 3 pixels by 3 pixels having a target pixel as a center in the horizontal direction within a searching area R2 in the left image and calculates ZSSD as a matching cost every time the window is moved by one pixel. The searching area R2 is set as described below. That is, when defining a coordinate of the target pixel as (u, v), defining an integer part of an average parallax d1ave of a three-dimensional object block 32a into which a three-dimensional object parallax point corresponding to this target pixel is classified (voted) as di, and defining a coordinate of the left image as (u', v'), the searching area R2 is set to be an area satisfying u'=u+di−1 to u'=u+di+2 in the lateral direction and v'=v in the longitudinal direction.

Thereafter, the ECU 10 plots matching costs on a graph defining a relationship between a shifting amount of a pixel (a number of pixels corresponding to a displacement of a u coordinate of a pixel) (on a lateral axis) and a matching cost (on a longitudinal axis) and calculates a shifting amount of a pixel corresponding to a minimum value of the matching costs by parabola fitting. This shifting amount of a pixel corresponds to the second parallax d2. By performing parabola fitting, the second parallax d2 is calculated as a value including a decimal part. The ECU 10 stores the second parallax d2 calculated for the target pixel in the RAM thereof, associating the second parallax d2 with a coordinate of this target pixel. The ECU 10 calculates the second parallax d2 for all the target pixels for which T>Tth is determined to be satisfied in the brightness index value determination.

<Calculation of a Final Parallax df>

The ECU 10 calculates two types of final parallaxes df based on the aforementioned three determination results. Specifically, in following three cases, that is, "when having determined that the target parallax point is not the three-dimensional object parallax point in the three-dimensional object parallax point determination", "when having determined that although the target parallax point is the three-dimensional object parallax point, d1ave≤d1th is not satisfied in the average parallax determination", and "when having determined that although d1ave≤d1th is determined to be satisfied in the average parallax determination, T>Tth is not satisfied in the brightness index value determination", the ECU 10 calculates the first parallax d1 calculated for a target pixel corresponding to the target parallax point as a final parallax df of this target pixel. On the other hand, in a case when having determined that the target parallax point is the three-dimensional object parallax point in the three-dimensional object parallax point determination, having determined that d1ave≤d1th is satisfied in the average parallax determination, and having determined that T>Tth is satisfied in the brightness index value determination, the ECU 10 calculates "a parallax where a decimal part of the first parallax d1 calculated for the target pixel corresponding to the target parallax point is replaced with a decimal part of the second parallax d2 calculated for this target pixel" as a final parallax df of this target pixel.

(Actual Operation)

Next, an actual operation of the ECU 10 will be described. The CPU of the ECU 10 is configured to perform, during the engine on period, a routine shown by a flowchart of FIG. 6 every time the predetermined time (the computation interval) elapses.

Figure 6:
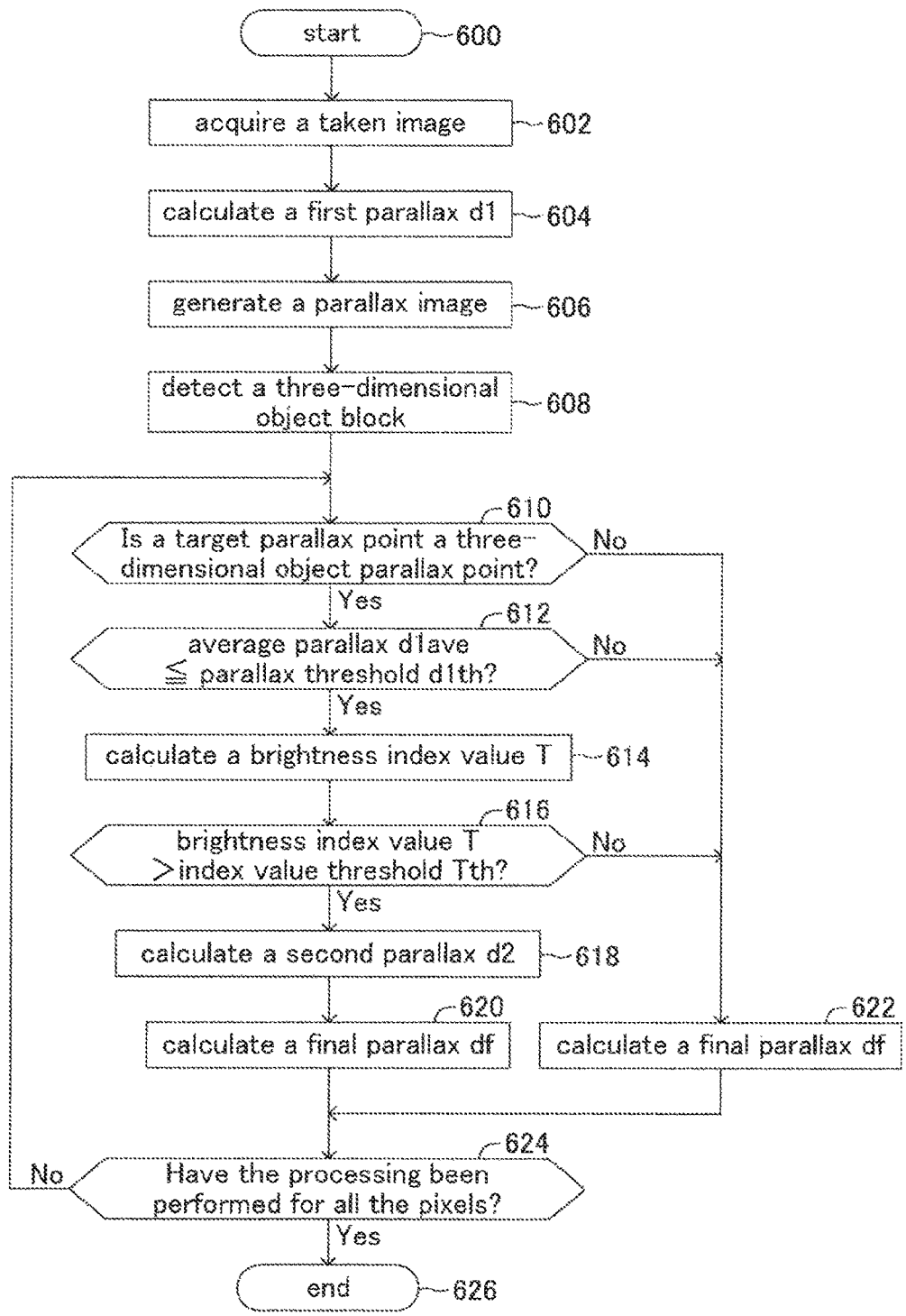
FIG. 6 is a flowchart showing a routine performed by CPU of parallax calculating ECU of the first embodiment apparatus.

When the engine switch is changed to the on state, the CPU starts processing from a step 600 in FIG. 6 and performs processing of following steps 602 to 608 in order.

Step 602: the CPU receives a left image signal and a right image signal from the camera sensor 11. That is, the CPU acquires a taken image including a left image and a right image (a reference image).

Step 604: the CPU calculates, on a basis of the reference image, a parallax between corresponding pixels in a left-and-right pair of the images as a first parallax d1 by means of the SGM method. The CPU calculates first parallaxes d1s for all of the pixels in the reference image.

Step 606: the CPU generates a parallax image based on the first parallaxes d1s.

Step 608: the CPU detects a three-dimensional object block(s) 32a from the parallax vote map 30 based on the parallax image.

After the processing of the step 608, the CPU proceeds to a step 610. At the step 610, the CPU determines whether or not a target parallax point corresponding to one of the pixels in the reference image is a three-dimensional object parallax point (the three-dimensional object parallax point determination). When having determined that this target parallax point is not a three-dimensional object parallax point, the CPU makes a "No" determination at the step 610 to perform processing of a step 622 mentioned later. On the other hand, when having determined that this target parallax point a three-dimensional object parallax point, the CPU makes an "Yes" determination at the step 610 to proceed to a following step 612.

At the step 612, the CPU determines whether or not an average parallax d1ave of a three-dimensional object block 32a (a target three-dimensional object block 32a) into which the target parallax point is classified is less than or equal to the parallax threshold d1th (d1ave≤d1th) (the average parallax determination). When having determined that d1ave≤d1th is not satisfied, the CPU makes a "No" determination at the step 612 to perform processing of the step 622 mentioned later. On the other hand, when having determined that d1ave≤d1th is satisfied, the CPU makes an "Yes" determination at the step 612 to perform processing of a following step 614.

Step 614: the CPU calculates a brightness index value T of a target pixel corresponding to the target parallax point. After the processing of the step 614, the CPU proceeds to a step 616.

At the step 616, the CPU determines whether or not the brightness index value T of the target pixel is greater than the index value threshold Tth (the brightness index value determination). When having determined that T>Tth is not satisfied, the CPU makes a "No" determination at the step 616 to perform processing of the step 622 mentioned later. On the other hand, when having determined that T>Tth is satisfied, the CPU makes an "Yes" determination at the step 616 to perform processing of following steps 618 and 620 in order.

Step 618: the CPU calculates, for the target pixel, on a basis of the reference image, a parallax between corresponding pixels in a left-and-right pair of the images as a second parallax d2 by means of the BM method.

Step 620: the CPU calculates a parallax where a decimal part of the first parallax d1 calculated for the target pixel at the step 604 is replaced with a decimal part of the second parallax d2 calculated at the step 618 as a final parallax df of this target pixel.

In contrast, when having made a "No" determination at any one of the step 610, the step 612, and the step 616, the CPU performs processing of the following step 622.

Step 622: the CPU calculates the first parallax d1 calculated for the target pixel at the step 604 as a final parallax df of this target pixel.

After the processing of the step 620 or the step 622, the CPU proceeds to a step 624. At the step 624, the CPU determines whether or not the processing after the step 610 have been performed for all the pixels in the reference image. When having determined that the processing have not yet been performed for all the pixels, the CPU makes a "No" determination at the step 624 and returns to the step 610 to repeat the processing after the step 610 for rest of the pixels in the reference image. On the other hand, when having determined that the processing have been performed for all the pixels in the reference image, the CPU makes an "Yes" determination at the step 624 and proceeds to a step 626 to tentatively terminate the present routine.

(Operation Detail of the Three-dimensional Object Display Control Apparatus)

Next, operation detail of the three-dimensional object display control apparatus will be described. The ECU 20 of the three-dimensional object display control apparatus extracts pixels corresponding to the three-dimensional object parallax points when having acquired from the ECU 10 the pixel information including the final parallaxes dfs of all the pixels in the reference image. The extracted pixels include a pixel for which re-calculation of a parallax by the BM method has been conducted and a pixel for which the re-calculation has not been conducted. When the three-dimensional object parallax points in a three-dimensional object block 32a include three-dimensional object parallax points, each of which corresponding to a pixel for which the re-calculation of a parallax by the BM method (hereinafter, also simply referred to as "re-calculation of a parallax") has been conducted, the ECU 20 extracts, from the pixels corresponding to the three-dimensional object parallax points in this three-dimensional object block 32a, all the pixels for each of which the re-calculation of a parallax has been conducted. Thereafter, the ECU 20 calculates a median of the final parallaxes dfs of the extracted pixels as a representative parallax of this three-dimensional object block 32a. On the other hand, when the three-dimensional object parallax points in a three-dimensional object block 32a do not include any three-dimensional object parallax points, each of which corresponding to a pixel for which the re-calculation of a parallax has been conducted, the ECU 20 calculates the average parallax d1ave as a representative parallax of this three-dimensional object block 32a. That is, each of the three-dimensional object block 32a in the parallax vote map 30 has either one of a representative parallax as a medium of the final parallaxes dfs or a representative parallax as the average parallax d1ave.

The ECU 20 performs processing of coupling three-dimensional object blocks 32a based on these representative parallaxes. Specifically, the ECU 20 transforms each of these representative parallaxes into a three-dimensional coordinate to calculate a distance in the depth direction (a depth distance) from the own vehicle to a three-dimensional object block 32a (strictly, a three-dimensional object or a part of a three-dimensional object, each of which corresponding to this three-dimensional object block 32a). Thereafter, when two three-dimensional object blocks 32a are adjacent to each other in the depth direction in the parallax vote map 30, the ECU 20 determines whether or not a difference in the depth distances of these two three-dimensional object blocks 32a is less than or equal to a predetermined depth distance threshold.

When having determined that a difference in the depth distances is less than or equal to the depth distance threshold, the ECU 20 determines that these two three-dimensional object blocks 32a correspond to one continuous three-dimensional object and couples these three-dimensional object blocks 32a. Hereinafter, three-dimensional object blocks 32a, each of which is coupled with each other is referred to as a "coupled three-dimensional object block 32a". On the other hand, when having determined that a difference in the depth distances exceeds the depth distance threshold, the ECU 20 determines that each of these two three-dimensional object blocks 32a corresponds to an individual three-dimensional object and does not couple these three-dimensional object blocks 32a. The ECU 20 performs the above processing for all the three-dimensional object blocks 32a adjacent to each other in the depth direction in the parallax vote map 30 and couples three-dimensional object blocks 32a.

It should be noted that the processing of coupling three-dimensional object blocks 32a may be performed also in the lateral direction (the vehicle width direction). In this case, the ECU 20 transforms not only the representative parallax of a three-dimensional object block 32a into a three-dimensional coordinate, but also transforms all the three-dimensional object parallax points in this block 32a into three-dimensional coordinates, and calculates a minimum value of a distance in the lateral direction (a lateral distance) between two three-dimensional object blocks 32a adjacent to each other in the lateral direction. Thereafter, when having determined that this minimum value is less than or equal to a predetermined lateral distance threshold, the ECU 20 couples these two three-dimensional object block 32a to regard them as a coupled three-dimensional object block 32a. On the other hand, when having determined that this minimum value exceeds the lateral distance threshold, the ECU 20 does not couple these two three-dimensional object blocks 32a. The ECU 20 performs the above processing for all the three-dimensional object blocks 32a adjacent to each other in the lateral direction in the parallax vote map 30 and couples three-dimensional object blocks 32a.

"A group (set) of three-dimensional object parallax points in a three-dimensional object block 32a" and "a group (set) of three-dimensional object parallax points in a coupled three-dimensional object block 32a" after the coupling processing of three-dimensional object blocks 32a correspond to a three-dimensional object in the reference image. That is, the ECU 20 detects a three-dimensional object in the reference image by performing the coupling processing of three-dimensional object blocks 32a. The ECU 20 has the display apparatus 21 display a detection result (that is, a position, a shape, a distance from the own vehicle of each three-dimensional object, and the like) of a three-dimensional object.

Effects of the first embodiment apparatus will be described. According to the configuration of the first embodiment apparatus, the first parallax d1 is calculated as the final parallax for all the pixels in the reference image, and therefore a parallax can be calculated even for a pixel included in the low texture region. In addition, for a part of the pixels in the reference image, each of which corresponding to a three-dimensional object, a parallax where a decimal part of the first parallax d1 is replaced with a decimal part of the second parallax d2 is calculated as the final parallax df, and thus an occurrence of the pixel locking can be suppressed for this final parallax d1, leading to a significant improvement in accuracy of a decimal part of this final parallax df. As a result, it becomes possible to calculate a parallax of each of the pixels with a high accuracy while calculating a parallax even for a pixel included in the low texture region in the taken image.

Especially, in the first embodiment apparatus, the second parallax d2 is calculated for a group of pixels classified in to a three-dimensional object block 32*a*, that is, a group of pixels with a tendency of a relatively high texture, whereas the second parallax d2 is not calculated for a group of pixels classified in to a block 32 other than a three-dimensional object block 32*a*, that is, a group of pixels with a tendency of a relatively low texture or a group of pixels with an uncertain tendency of a texture. According to this configuration, the second parallax d2 is selectively calculated for a pixel included in a region with a high possibility of calculating the second parallax d2 in a proper manner, and thus a processing efficiency can be improved while suppressing a reduction in a calculation accuracy of a parallax.

In addition, a decrease in the calculation accuracy of a parallax due to the pixel locking becomes remarkable as the parallax becomes small. Therefore, the first embodiment apparatus calculates the average parallax d1ave for every three-dimensional object block 32*a* and selectively calculates the second parallax d2 only for a pixel corresponding to a three-dimensional object block 32*a*, the average parallax d1ave thereof being less than or equal to the parallax threshold d1th (that is, only for a pixel, a decrease in the calculation accuracy of the parallax thereof due to the pixel locking being remarkable) to calculate the final parallax df. That is, the second parallax d2 is not calculated for a pixel, the calculation accuracy of the parallax thereof not decreasing very much due to the pixel locking because the parallax thereof is relatively large. According to this configuration, the processing efficiency can be further improved while suppressing the reduction in the calculation accuracy of a parallax.

Further, the first embodiment apparatus selectively calculates the second parallax d2 only for a pixel, the brightness index value T thereof being greater than the index value threshold Tth (that is, only for a pixel included in a region with a relatively high texture) to acquire the final parallax df. According to this configuration, a possibility of trying to calculate the second parallax d2 also for a pixel for which the second parallax d2 may not be properly calculated by the BM method (that is, a pixel included in the low texture region) can be significantly reduced, and as a result, the processing efficiency can be further improved while suppressing the reduction in the calculation accuracy of a parallax.

Figure 7A:
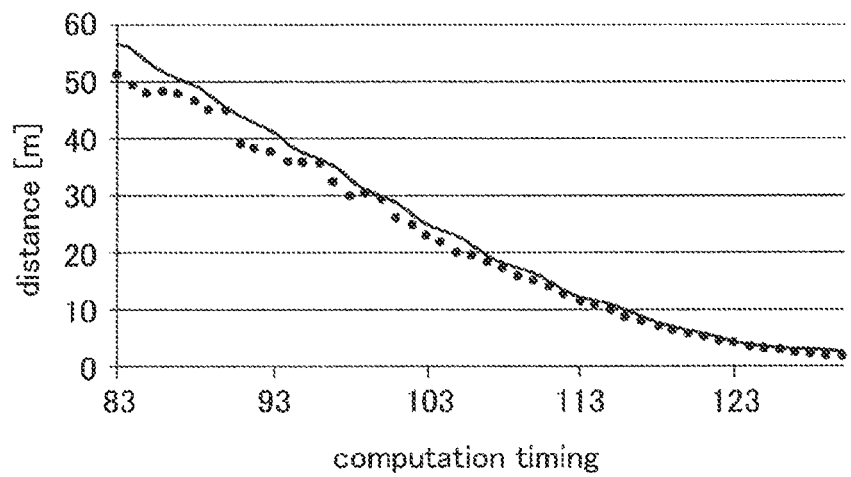
FIG. 7A is a graph defining a relationship between a computation timing and a distance in a depth direction to a stationary three-dimensional object, the distance being calculated based on a conventional parallax calculating method in a case when an own vehicle approaches this three-dimensional object at a constant speed.
Figure 7B:
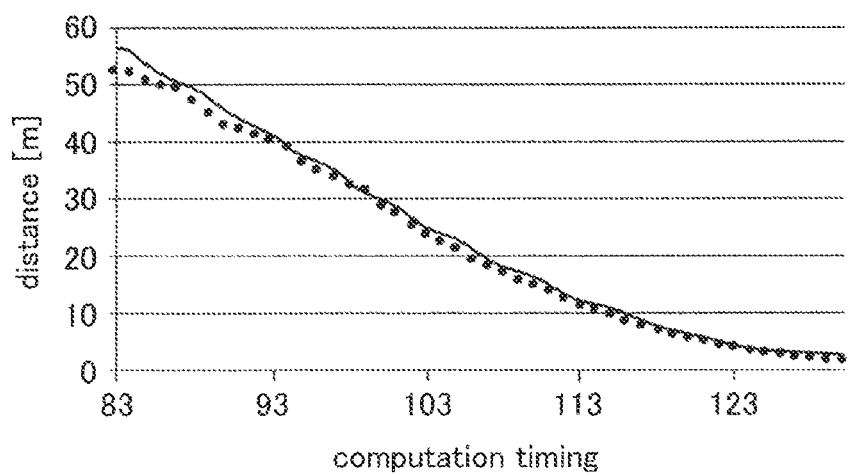
FIG. 7B is a graph defining a relationship between a computation tuning and a distance in a depth direction to a stationary three-dimensional object, the distance being calculated based on a parallax calculating method of the first embodiment apparatus in a case when an own vehicle approaches this three-dimensional object at a constant speed.

Now, a sequential transition of a distance in the depth direction from the own vehicle to a three-dimensional object (hereinafter, simply referred to as a "distance") in a case when this three-dimensional object is detected based on the final parallax output from the first embodiment apparatus will be described, referring to FIG. 7A and FIG. 7B. FIG. 7A and FIG. 7B both shows situations where the own vehicle is approaching a stationary three-dimensional object at a constant speed. FIG. 7A is a graph defining a relationship between a computation timing and a distance calculated based on a conventional parallax calculating method (Hereinafter, this distance is simply also referred to as a "calculated distance"). FIG. 7B is a graph defining a relationship between a computation timing and a distance calculated based on a parallax calculating method of the first embodiment apparatus. In both graphs, a solid line represents a transition of an actual distance to the three-dimensional object and a broken line represents a transition of the calculated distance.

According to the graph of FIG. 7A, a transition of the calculated distance substantially coincides with a transition of the actual distance when a distance becomes short as a result of the own vehicle approaching the three-dimensional object. However, as the distance to the three-dimensional object becomes longer, the calculated distance is largely deviated from the actual distance. In addition, so called "distance skipping" where the calculated distance abruptly changes occurs on a regular basis. This is considered to be originated from that a parallax is small at an area where the distance is long and thus an influence of the pixel locking on this area tends to be relatively large. On the other hand, according to the graph of FIG. 7B, a transition of the calculated distance is smooth and substantially coincides with a transition of the actual distance. In addition, a deviation of the calculated distance at an area where the distance is long is small. This shows that a configuration of the first embodiment apparatus suppresses an occurrence of the pixel locking.

Second Embodiment

Next, a parallax calculating apparatus (hereinafter, also referred to as a "second embodiment apparatus") according to a second embodiment of the present invention will be described, referring to FIG. 8. The second embodiment apparatus differs from the first embodiment apparatus in that the second embodiment apparatus calculates the second parallax d2 by the BM method for all the pixels in the reference image (that is, all pixels for each of which the first parallax d1 being calculated). The CPU of the ECU 10 of the second embodiment apparatus is configured to perform, during the engine on period, a routine shown by a flowchart of FIG. 8 every time the predetermined time (the computation interval) elapses.

Figure 8:
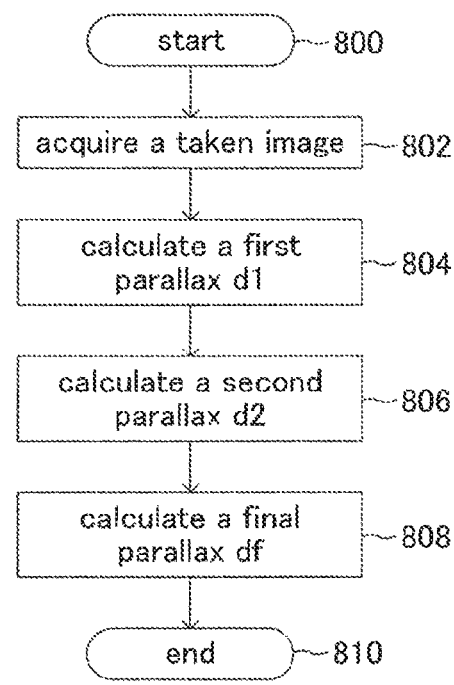
FIG. 8 is a flowchart showing a routine performed by CPU of parallax calculating ECU of a second embodiment apparatus.

When the engine switch is changed to the on state, the CPU starts processing from a step 800 in FIG. 8 and performs processing of following steps 802 to 808 in order.

Step 802: the CPU acquires a taken image including a left image and a right image (a reference image) from the camera sensor 11.

Step 804: the CPU calculates, on a basis of the reference image, a parallax between corresponding pixels in a left-and-right pair of the images as a first parallax d1 by means of the SGM method. The CPU calculates first parallaxes d1s for all of the pixels in the reference image.

Step 806: the CPU calculates, on a basis of the reference image, a parallax between corresponding pixels in a left-and-right pair of the images as a second parallax d2 by means of the BM method. The CPU calculates second parallaxes d2s for all of the pixels in the reference image.

Step 808: the CPU calculates a parallax where a decimal part of the first parallax d1 calculated for the target pixel at the step 804 is replaced with a decimal part of the second parallax d2 calculated at the step 806 as a final parallax df of this target pixel.

After the processing of the step 808, the CPU proceeds to a step 810 to tentatively terminate the present routine.

Effects of the second embodiment apparatus will be described. According to this configuration, the first parallax d1 is calculated as the final parallax df for all the pixels in the reference image, and therefore a parallax can be calculated even for a pixel included in the low texture region. In addition, a parallax where a decimal part of the first parallax d1 is replaced with a decimal part of the second parallax d2 is calculated as the final parallax df for all the pixels in the reference image, and therefore an occurrence of the pixel locking can be suppressed in a wider area in the reference image, leading to a significant improvement in the accuracy of a parallax. As a result, a parallax of each of the pixels can be calculated with a high accuracy while calculating a parallax even for a pixel included in the low texture region in the taken image.

The parallax calculating apparatuses according to the embodiments have been described. However, the present invention is not limited to the aforementioned embodiments and may adopt various modifications within a scope of the present invention.

For example, in the first embodiment, the second parallax d2 is calculated only for a pixel where d1ave≤d1th and T>Tth are both satisfied among the pixels corresponding to the three-dimensional object parallax points. However, a configuration is not limited thereto. For example, the second parallax d2 may be calculated for all the pixels corresponding to the three-dimensional object parallax points. Even for a pixel where d1ave≤d1th is not satisfied (that is, a distance from the own vehicle to a region corresponding to this pixel is less than the distance threshold), an influence due to the pixel locking is not completely eliminated. Therefore, by calculating the second parallax d2 also for such pixels to acquire the final parallax df, a parallax can be calculated with a higher accuracy.

Alternatively, a configuration where the second parallax d2 is calculated only for a pixel where d1ave≤d1th is satisfied among the pixels corresponding to the three-dimensional object parallax points may be adopted, or a configuration where the second parallax d2 is calculated only for a pixel where T>Tth is satisfied among the pixels corresponding to the three-dimensional object parallax points may be adopted.

In addition, the left image may be set as the reference image.

The invention claimed is:

1. A parallax calculating apparatus comprising;
   imaging means for taking an image of a region by means of a stereo camera every time a predetermined time elapses;
   first parallax calculating means for calculating, on a basis of a reference image which is one of taken images used as a reference, said taken images being taken at a same computation timing by said imaging means, a first parallax which is a parallax between corresponding pixels of said taken images for all pixels in said reference image by using Semi Global Matching method;
   second parallax calculating means for calculating, on a basis of said reference image, a second parallax which is a parallax between corresponding pixels of said taken images for at least a part of pixels among pixels in said reference image by using Block Matching method; and
   final parallax calculating means for calculating, based on said first parallax and said second parallax, a final parallax which is a finally calculated parallax of each of said pixels in said reference image;
   wherein,
   said final parallax calculating means is configured to;
      calculate said first parallax as said final parallax for a pixel for which only said first parallax has been calculated; and
      calculate a parallax where a decimal part of said first parallax is replaced with a decimal part of said second parallax as said final parallax for a pixel for which said first parallax and said second parallax have been calculated.

2. The parallax calculating apparatus according to claim 1 further comprising pixel extracting means for extracting, based on said first parallax, a pixel corresponding to a three-dimensional object candidate among pixels in said reference image, wherein,
   said second parallax calculating means is configured to calculate said second parallax only for said extracted pixel.

3. The parallax calculating apparatus according to claim 2, wherein,
   said second parallax calculating means is configured to;
      calculate an average parallax which is an average value of said first parallaxes of said extracted pixels for every said three-dimensional object candidate; and
      calculate said second parallax only for a pixel corresponding to said three-dimensional object candidate, said average parallax thereof being less than or equal to a predetermined parallax threshold.

4. The parallax calculating apparatus according to claim 2, wherein,
   said second parallax calculating means is configured to;
      calculate, for said extracted pixel, a brightness index value which is an index indicating a magnitude of a difference between lightness and darkness; and
      calculate said second parallax only for a pixel, said brightness index value thereof being greater than a predetermined index value threshold.

5. The parallax calculating apparatus according to claim 2, wherein,
   said second parallax calculating means is configured to;
      calculate an average parallax which is an average value of said first parallaxes of said extracted pixels for every said three-dimensional object candidate;
      calculate, for a pixel corresponding to said three-dimensional object candidate, said average parallax thereof being less than or equal to a predetermined parallax threshold, a brightness index value which is an index indicating a magnitude of a difference between lightness and darkness; and
      calculate said second parallax only for a pixel, said brightness index value thereof being greater than a predetermined index value threshold.

6. A parallax calculating apparatus comprising;
   a stereo camera for taking a stereo image of a region every time a predetermined time elapses;
   a processor;
   a non-transitory computer-readable storage medium; and
   a set of computer-executable instructions stored on said computer-readable storage medium that cause said processor to implement:
   calculating, on a basis of a reference image which is one of stereo images used as a reference, said stereo images being taken at a same computation timing by said stereo camera, a first parallax which is a parallax between corresponding pixels of said stereo images for all pixels in said reference image by using Semi Global Matching method;
   calculating, on a basis of said reference image, a second parallax which is a parallax between corresponding pixels of said stereo images for at least a part of pixels among pixels in said reference image by using Block Matching method; and calculating, based on said first parallax and said second parallax, a final parallax which is a finally calculated parallax of each of said pixels in said reference image; wherein, said processor is configured to;
  calculate said first parallax as said final parallax for a pixel for which only said first parallax has been calculated; and
  calculate a parallax where a decimal part of said first parallax is replaced with a decimal part of said second parallax as said final parallax for a pixel for which said first parallax and said second parallax have been calculated.

7. A non-transitory computer-readable storage medium having computer-executable instructions, said instructions comprising;
  acquiring a set of images of a region every time a predetermined time elapses, said set of images being taken by a stereo camera;
  calculating, on a basis of a reference image which is one of said set of images used as a reference, said set of images being taken at a same computation timing by said stereo camera, a first parallax which is a parallax between corresponding pixels of said set of images for all pixels in said reference image by using Semi Global Matching method;
  calculating, on a basis of said reference image, a second parallax which is a parallax between corresponding pixels of said set of images for at least a part of pixels among pixels in said reference image by using Block Matching method; and
  calculating, based on said first parallax and said second parallax, a final parallax which is a finally calculated parallax of each of said pixels in said reference image; wherein, said calculating a final parallax is configured to;
  calculate said first parallax as said final parallax for a pixel for which only said first parallax has been calculated; and
  calculate a parallax where a decimal part of said first parallax is replaced with a decimal part of said second parallax as said final parallax for a pixel for which said first parallax and said second parallax have been calculated.

* * * * *